Patented Mar. 4, 1924.

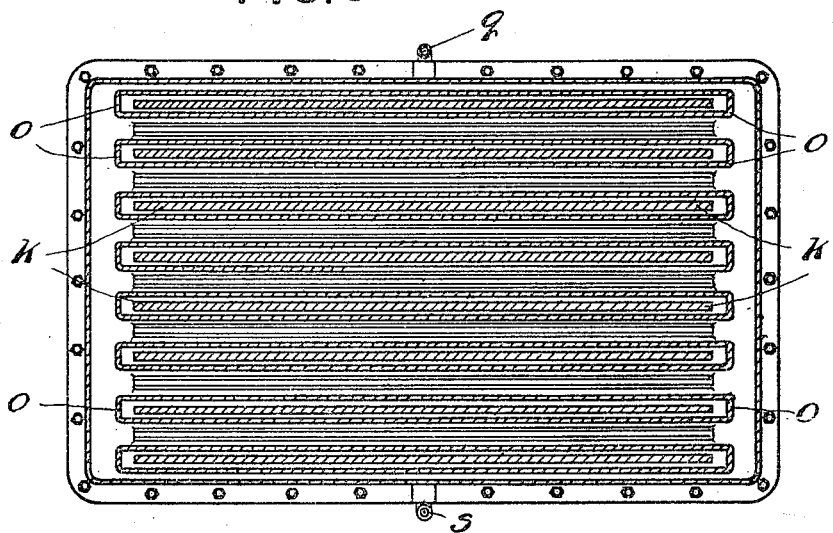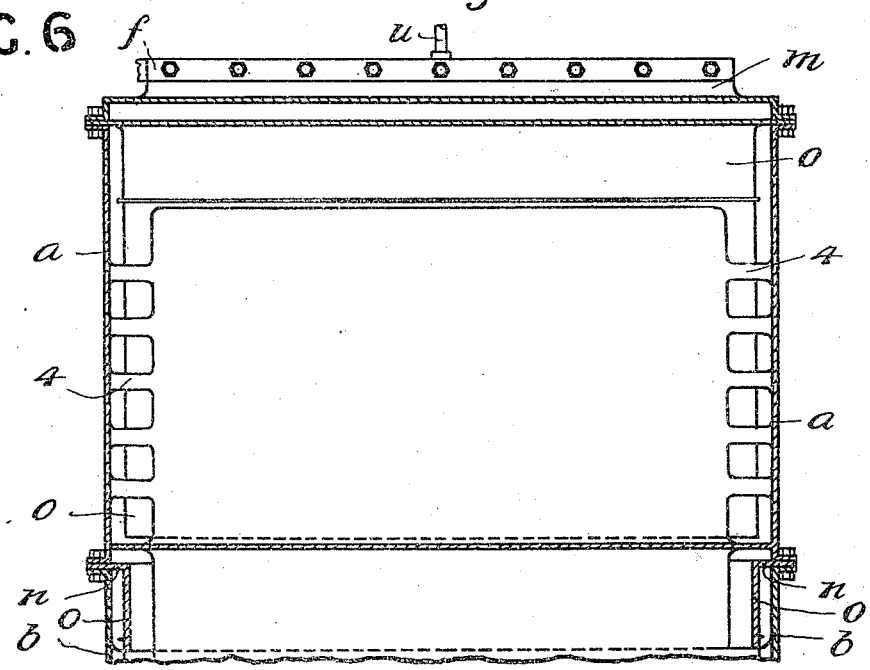

1,485,461

UNITED STATES PATENT OFFICE.

ALBERT EDGAR KNOWLES, OF HESWALL, ENGLAND.

ELECTROLYTIC CELL.

Application filed July 13, 1922. Serial No. 574,639.

*To all whom it may concern:*

Be it known that I, ALBERT EDGAR KNOWLES, subject of the King of Great Britain, of Denecourt, Oldfield Drive, Heswall, Cheshire, England, have invented certain new and useful Improvements in and Relating to Electrolytic Cells, of which the following is a specification.

This invention relates to improvements in electrolytic cells and refers particularly to electrolytic cells adapted for use in the commercial production of oxygen and hydrogen by the electrolysis of water.

In the ordinary form of cell employed for this process it is found uneconomical to employ electrodes of depth greater than a certain definite limit, as, where very long electrodes are employed, the gases generated on the lower portions of the electrodes and passing up over the surface of the plates reduce the conductivity of the electrolyte to such an extent that the upper parts of the electrodes do no useful work.

As the depth of the cells is limited it follows that in large plants the number of cells which must be employed will occupy a very considerable floor space and will involve heavy expenses in accommodation and in the necessary electric wiring and connections which must be of heavy construction to carry the heavy current required.

The object of my invention is to provide an improved form of electrolytic cell which is extremely compact and occupies a minimum amount of floor space. Further advantages of my improved cell are that a very even distribution of the current through the electrodes is obtained, resulting in high efficiency of the plant and pure products, while the number of electrical connections and leads necessary for a battery of cells is very materially reduced.

My invention essentially comprises an improved electrolytic cell in which a series of cells are superimposed, the electrodes of similar polarity in one cell being secured to, or formed integral with, the bottom plate of the cell above, which has secured to it, or made integral with it, the electrodes of opposite polarity for the upper cell, and so on throughout the series which may extend to, say, nine or fifteen tiers of cells. For example, the negative electrodes of the lowermost cell or tier of a vertical series may be formed as plates depending from and integral with the horizontal partition which forms the bottom of the second cell. This partition has a further series of parallel plates extending upwards from it and forming the positive electrodes for the second cell.

The negative electrodes for the second cell are formed by parallel plates depending from the partition forming the bottom of the third cell and alternating with the positive plates. The current thus passes directly from each cell to the cell above without any extraneous leads or connections, the polarity being reversed as it passes from one cell to the next, and the only electrical connections required are to the bottom of the lowermost cell and to the cover of the upper cell of a vertical series.

If desired, the upper cell of each of a succession or row of vertical groups or series may be of a polarity opposite to that of the upper cell of the next series, so that the current may be led directly from each upper cell to the adjacent one. By this construction the leads are reduced to a minimum, since, apart from the connections to the first and last cells of a row or succession, the only connections required are between the top cells and bottom cells alternately of adjacent vertical groups or series.

A partition is provided in each cell near the upper end thereof and has depending sleeves or diaphragms of porous material which surround the electrode plates of one polarity so that the gases generated upon the electrode plates of opposite polarity are separated and may be led off into collecting pipes in any desired manner.

A preferred embodiment of my invention is illustrated in the accompanying drawings in which—

Figure 5, is a horizontal section similar to Fig. 3, but showing a modified construction in which the upwardly extending electrodes are not carried outwards to meet the side walls of the cell.

Figure 6, is a diagrammatic vertical section similar to Fig. 2 but showing a further modification in which the upwardly extending electrodes are connected to the side walls of the cell by spaced webs.

Similar letters refer to similar parts throughout the drawings.

Each vertical series or group of cells consists of a series of superimposed cells $a$, $b$, $c$, of box or tank form, any suitable means being provided for feeding electrolyte to the cells.

The bottom plate of the lower cell $c$ is provided with feet or flanges by which the tier is supported upon suitably insulated blocks $d$, and a series of downwardly projecting parallel ribs $e$ provide the connections for the electric current which is led thereto by copper bars or strips $f$ bolted to the ribs $e$.

Parallel electrode plates $g$ which preferably decrease in thickness towards their upper ends project upwards from the bottom plate inside the cell and virtually divide the cell into a number of small narrow cells, each of which is supplied with current through one of the ribs $e$.

The upper closure for the cell $c$ is formed by the base of the next cell $b$ above, from which depend electrode plates $h$ similar to and alternating with the electrodes $g$, the plates $h$ extending to within a short distance of the bottom of the cell $c$. A further series of parallel plates $j$ extend upwards from the base of the cell $b$ and alternate with electrode plates $k$ depending from the base of the next cell above.

Each cell in the series is formed in a similar manner until the topmost cell $a$ is reached, the cover for this cell having depending electrode plates $l$ and external parallel ribs $m$ to which copper current leads are bolted as described in connection with the lower ribs $e$. The method of separating the gases generated in the cells is exactly similar in each cell, and may be described with reference to the lowermost cell $c$.

A horizontal partition member or diaphragm $n$, insulated from the cell above and below, is arranged a short distance below the bottom of the cell $b$, and has a series of depending tubular flanges $o$ around slots or apertures through which the depending electrodes $h$ pass. The flanges $o$ support porous depending diaphragms or sleeves $p$ of asbestos, gauze, or the like which surround the electrodes $h$ and separate the gas generated thereon from the gas generated on and rising from the electrodes $g$.

The gas generated on the electrodes $h$ passes upwards through the partition or diaphragm $n$ into the space between the partition and the base of the cell $b$, and from this space the gas is led away into a vertical collecting pipe $q$ connected by a union to a socket $r$ cast or otherwise formed at the upper end of the cell.

Figure 1:
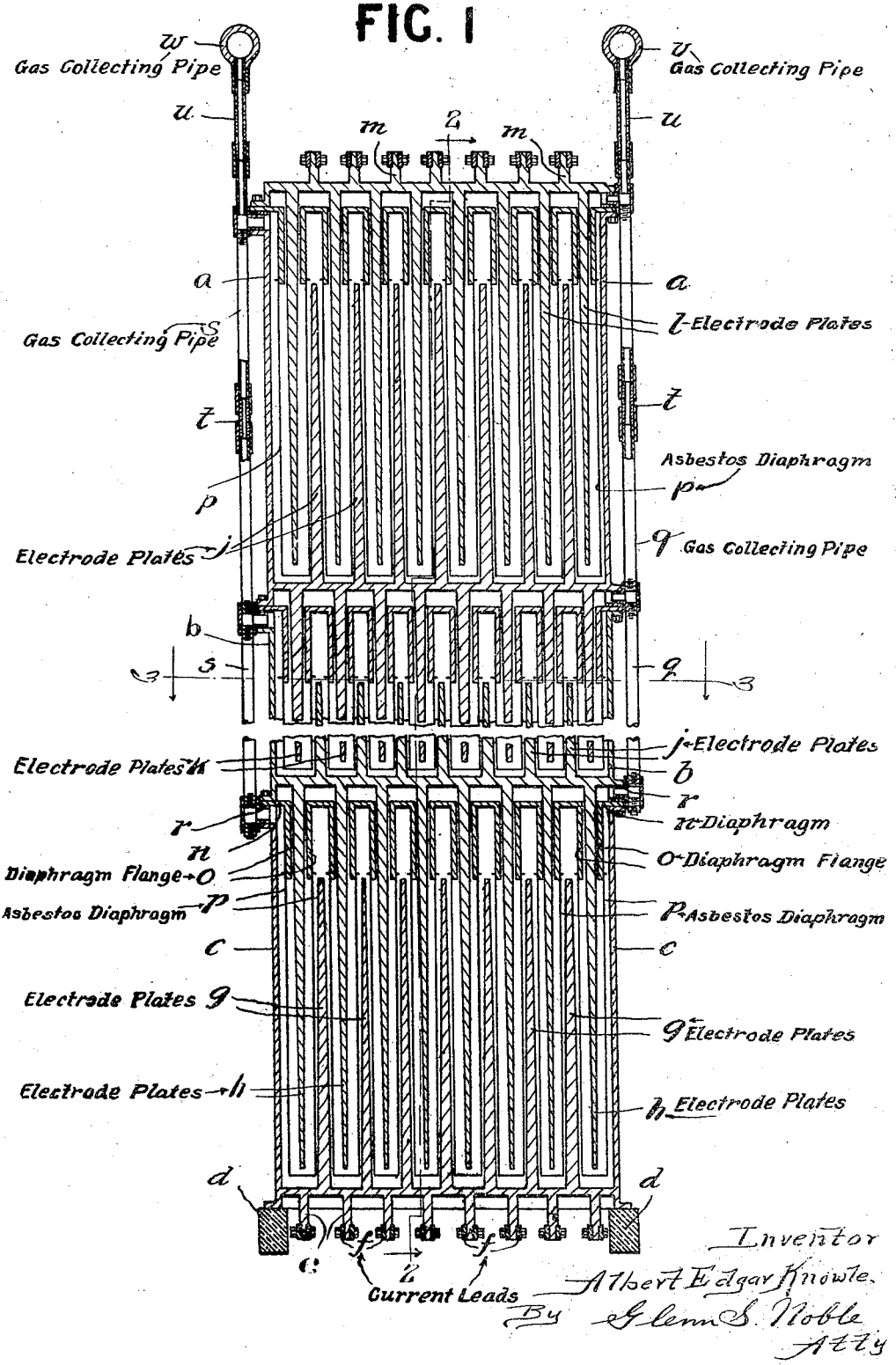
Figure 1 is a vertical longitudinal section of one vertical series or group of cells.

The gas generated on the electrodes $g$ is prevented by the diaphragms or sleeves $p$ from passing through the apertures in the partition $n$ and collects below the partition from which it is led into a second collecting pipe $s$. The collecting pipes $q$ and $s$ receive the gas from the corresponding electrodes of all the cells in a vertical series or group, the pipes being divided into lengths insulated from each other between the respective cells by inserting a short length of piping $t$ of insulating material such as glass. As the pipes are only subjected to the difference of potential between two adjacent cells the insulating piping need only be of short length as shown in Fig. 1.

A further length of insulating piping $u$ is provided between the vertical pipes $q$ and $s$ and the unions by which they are connected to the main gas collecting pipes $v$, $w$, which receive the gases from a row or series of tiers or groups of cells.

Figure 4:
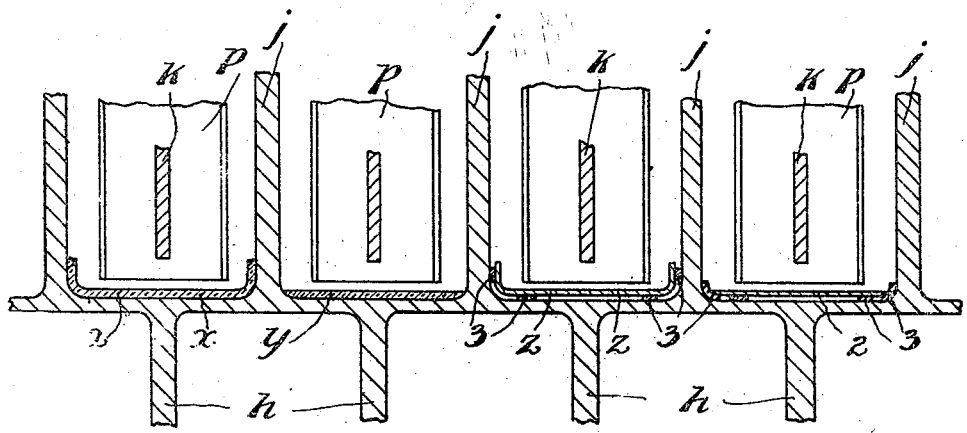
Figure 4, is an enlarged sectional view of a portion of the lower part of one cell showing different methods of insulating the depending electrodes from the bottom plate of the cell.

If the lower edges of the electrode plates $h$ are spaced sufficiently far from the bottom of the cell, insulation between the electrode and the bottom of the cell is not essential, but if desired, insulation may be provided in any of the methods illustrated in Fig. 4.

At $x$ is shown a dished layer of insulating material lying upon the bottom of the cell and extending for a short distance up the sides, while at $y$ is shown a flat strip of insulating material lying upon the bottom of the cell only.

In the other modifications shown $z$ and 2 are metallic guard members supported upon narrow strips of insulation 3.

As a further modification the insulation may be dispensed with, and the diaphragms or sleeves $p$ may be closed or nearly closed below the lower ends of the electrodes $h$.

Figure 2:
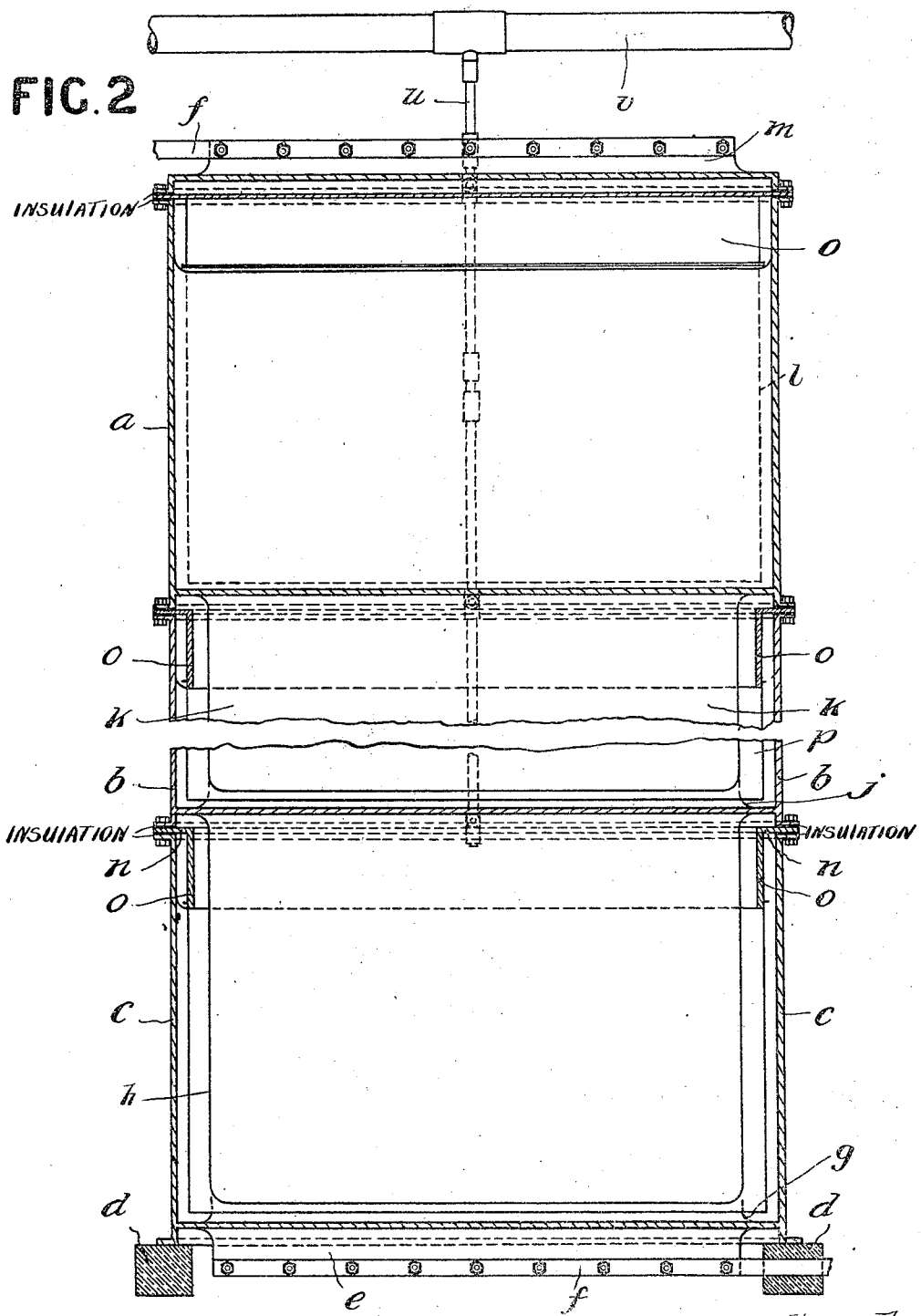
Figure 2, is a vertical section on the line 2—2 of Fig. 1.
Figure 3:
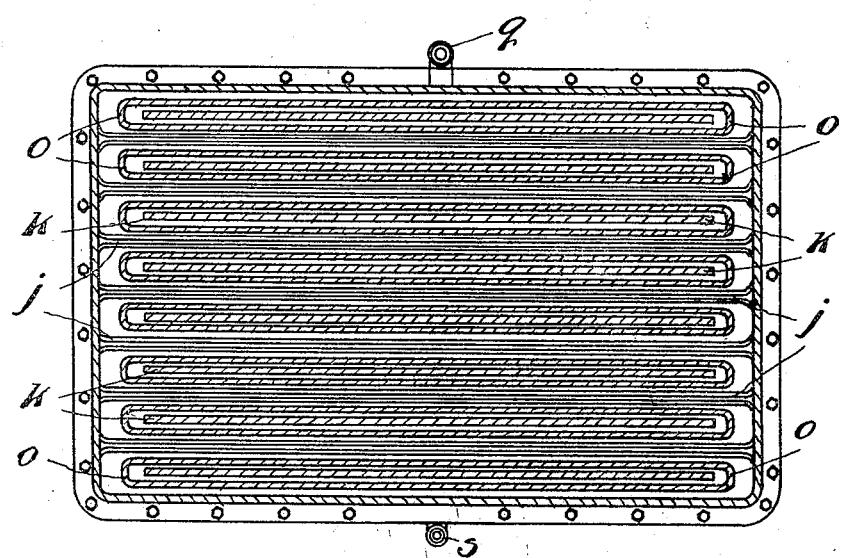
Figure 3, is a horizontal section on the line 3—3 of Fig. 1.

In the embodiment illustrated in Figs. 1, 2, and 3, the electrode plates $g$ which project upwards from the bottom of each cell are shown extending to the sides of the tank or cell so that the cell is divided into a number of smaller narrow cells as illustrated in Fig. 3. This construction provides an extremely strong cell, but suffers from the disadvantage that the electrolyte must be fed separately to each of these smaller cells and that it is difficult to ensure that the electrolyte is at the same level in each cell.

In the alternative construction shown in section in Fig. 5, the electrodes $g$ are not continued to the sides of the cell or tank, but are made of the same width as the electrodes $h$. This construction is not so strong as the construction illustrated in Figs. 1, 2 and 3, but allows a free circulation of the electrolyte which can be fed in from one point for the whole cell. It is obvious that instead of completely separating these electrodes from the sides they may be joined thereto at intervals by webs 4, as shown in sectional elevation in Fig. 6, thus giving structural strength without impeding the circulation of electrolyte through the whole chamber.

I claim:

1. An electrolytic plant for the production of oxygen and hydrogen by the electrolysis of water, comprising a group of superimposed cells, partitions between adjacent cells, electrodes extending upwardly from each of the said partitions into the cell above, electrodes depending from each of the said partitions into the cell below, and current leads to the upper closure of the topmost cell and to the bottom of the lowermost cell of the group.

2. An electrolytic plant for the production of oxygen and hydrogen by the electrolysis of water, comprising a group of superimposed cells, a current lead to the upper closure of the topmost cell, electrode plates depending from the said upper closure and alternating with electrode plates extending upwardly from the partition between the topmost cell and the next cell below, electrode plates depending from the said partition and alternating with electrode plates extending upwardly from the partition between the said cell and the next cell below, and a current lead to the bottom of the lowermost cell of the group.

3. An electrolytic plant for the production of oxygen and hydrogen by the electrolysis of water, comprising a group of superimposed cells, current leads to the upper closure of the topmost cell and to the bottom of the lowermost cell of the group, partitions between adjacent cells, electrode plates depending from each of the said partitions into the cell below and electrode plates extending upwardly from each of the said partitions into the cell above and alternating with the depending electrode plates, the said upwardly extending electrode plates being extended to meet the side wall of the cell and being formed integral therewith.

4. An electrolytic plant for the production of oxygen and hydrogen by the electrolysis of water, comprising a group of superimposed cells, current leads to the upper closure of the topmost cell and to the bottom of the lowermost cell of the group, partitions between adjacent cells, electrodes extending upwardly from each of the said partitions into the cell above, electrodes depending from each of the said partitions into the cell below and alternating with the upwardly extending electrodes, a perforated horizontal partition near the upper end of each cell through which partition the depending electrodes pass, and sleeves carried by the said perforated partition surrounding the depending electrodes to separate the gas generated on these electrodes from the gas generated on the alternating upwardly extending electrodes.

5. An electrolytic plant for the production of oxygen and hydrogen by the electrolysis of water, comprising a group of superimposed cells, current leads to the upper closure of the topmost cell and to the bottom of the lowermost cell of the group, partitions between adjacent cells, electrodes extending upwardly from each of the said partitions into the cell above, electrodes depending from each of the said partitions into the cell below and alternating with the upwardly extending electrodes, a perforated horizontal partition near the upper end of each cell through which partition the depending electrodes pass, sleeves carried by the said perforated partition and surrounding the depending electrodes to separate the gas generated thereon from the gas generated on the alternating upwardly extending electrodes, and collecting pipes to receive the gases generated on the two sets of electrodes in each cell, the pipes being divided into sections corresponding to each cell and each section being insulated from the next.

In testimony whereof I affix my signature.

ALBERT EDGAR KNOWLES.